(12) United States Patent
Medles et al.

(10) Patent No.: US 12,356,352 B2
(45) Date of Patent: Jul. 8, 2025

(54) METHOD AND APPARATUS OF PHYSICAL RANDOM ACCESS CHANNEL TIMING ADVANCE OPERATION IN NON-TERRESTRIAL NETWORK COMMUNICATIONS

(71) Applicant: MediaTek Singapore Pte. Ltd., Singapore (SG)

(72) Inventors: Abdelkader Medles, Cambridge (GB); Gilles Charbit, Cambridge (GB); Chiao-Yao Chuang, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 508 days.

(21) Appl. No.: 17/796,541

(22) PCT Filed: Feb. 5, 2021

(86) PCT No.: PCT/CN2021/075583
§ 371 (c)(1),
(2) Date: Jul. 29, 2022

(87) PCT Pub. No.: WO2021/155845
PCT Pub. Date: Aug. 12, 2021

(65) Prior Publication Data
US 2023/0056527 A1    Feb. 23, 2023

Related U.S. Application Data

(60) Provisional application No. 62/970,218, filed on Feb. 5, 2020.

(51) Int. Cl.
*H04W 56/00* (2009.01)
*H04W 74/0833* (2024.01)

(52) U.S. Cl.
CPC ... *H04W 56/0045* (2013.01); *H04W 56/0065* (2013.01); *H04W 74/0833* (2013.01)

(58) Field of Classification Search
CPC ......... H04W 56/0045; H04W 56/0065; H04W 74/0833
See application file for complete search history.

(56) References Cited

U.S. PATENT DOCUMENTS

2014/0044108 A1*  2/2014  Earnshaw ............. G01S 5/0063
                                                        370/336
2019/0357159 A1  11/2019  Sandgren et al.
2022/0272762 A1*  8/2022  Määttänen ......... H04B 7/18504

FOREIGN PATENT DOCUMENTS

CA      2970923 A1    9/2015
CN   103348746 A     10/2013
(Continued)

OTHER PUBLICATIONS

Catt; "Prach design and UL timing advance"; 3GPP TSG RAN WG1 Meeting #97; R1-1906325; Reno, USA; May 13-17, 2019.
(Continued)

*Primary Examiner* — Elton Williams
(74) *Attorney, Agent, or Firm* — Andy M. Han; Han IP PLLC (57) ABSTRACT

Various solutions for physical random access channel (PRACH) timing advance operation and PRACH configurations with respect to user equipment and network apparatus are described. An apparatus may determine a propagation delay between the apparatus and a network node. The apparatus may determine a pre-compensation timing margin. The apparatus may perform a timing advance pre-compensation according to the propagation delay and the
(Continued)

pre-compensation timing margin. The apparatus may transmit an uplink signal by applying the timing advance pre-compensation.

14 Claims, 7 Drawing Sheets

(56) References Cited

FOREIGN PATENT DOCUMENTS

| | | | |
|---|---|---|---|
| CN | 105704807 A | 6/2016 | |
| CN | 109788548 A | 5/2019 | |
| EP | 4093111 A1 | 11/2022 | |
| EP | 4117376 A1 | 1/2023 | |
| EP | 4240101 A1 | 9/2023 | |
| WO | WO 2013063789 A1 | 5/2013 | |
| WO | WO 2020230761 A1 | 11/2020 | |
| WO | WO 2022031128 A1 | 2/2022 | |
| WO | WO 2022083705 A1 | 4/2022 | |
| WO | WO 2022086216 A1 | 4/2022 | |

OTHER PUBLICATIONS

Moderator (Thales); "FL Summary on enhancements on UL time and frequency synchronization for NR"; 3GPP TSG-RAN WG1 Meeting #103-e; R1-2009485; e-Meeting; Oct. 26-Nov. 13, 2020.
European Patent Office, Partial Supplementary European Search Report in European Patent Application No. 21750492.7-1206 / 4091387 PCT/CN2021075583, Feb. 2, 2024.
European Patent Office, Extended European Search Report in European Patent Application No. 21750492.7-1206 / 4091387 PCT/CN2021075583, May 28, 2024.
Ericsson: "On NTN synchronization, random access, and timing advance", 3GPP Draft; R1-1912725, vol. RAN WG1, No. Reno, USA; Nov. 8, 2019, XP051823562.
Panasonic: "Timing advance and PRACH design for NTN", 3GPP Draft; R1-1912903, vol. RAAN WG1, No. Reno, USA, Nov. 8, 2019, XP051820238.
China National Intellectual Property Administration, First Office Action in China Patent Application No. 202180012904.4, Jan. 20, 2025.

\* cited by examiner

METHOD AND APPARATUS OF PHYSICAL RANDOM ACCESS CHANNEL TIMING ADVANCE OPERATION IN NON-TERRESTRIAL NETWORK COMMUNICATIONS

CROSS REFERENCE TO RELATED PATENT APPLICATION(S)

The present disclosure is part of U.S. National Stage filing of International Patent Application No. PCT/CN2021/075583, filed on 5 Feb. 2021, which is part of a non-provisional application claiming the priority benefit of U.S. Patent Application No. 62/970,218, filed on 5 Feb. 2020, the contents of which being incorporated by reference in their entirety.

TECHNICAL FIELD

The present disclosure is generally related to mobile communications and, more particularly, to physical random access channel (PRACH) timing advance operation and PRACH configurations in non-terrestrial network (NTN) communications with respect to user equipment and network apparatus in mobile communications.

BACKGROUND

Unless otherwise indicated herein, approaches described in this section are not prior art to the claims listed below and are not admitted as prior art by inclusion in this section.

A non-terrestrial network (NTN) refers to a network, or a segment of network(s), using radio frequency (RF) resources on board a satellite or an unmanned aircraft system (UAS) platform. A typical scenario of an NTN providing access to a user equipment (UE) involves either NTN transparent payload, with the satellite or UAS platform acting as a relay, or NTN regenerative payload, with a base station (e.g., gNB) on board the satellite or UAS platform.

In Long-Term Evolution (LTE) or New Radio (NR), a random access channel (RACH) procedure is introduced to establish a connection with and obtain resource from a network node. In the first step of the RACH procedure, the UE needs to transmit a RACH preamble signal (e.g., Message 1) to the network node. In NTN communication, the RACH procedure is also introduced to establish a connection with a satellite. However, for the NTN deployment, large differential delay and residual frequency offset within a beam may occur due to long transmission distances. There are some issues need to be overcome for the RACH procedure in NTN communication.

In satellite NTN deployment, time and frequency synchronisation are very challenging. For example, for Geo-synchronous Equatorial Orbit (GEO) satellites, Sat-to-UE delay could be around 135 millisecond at 10° elevation with a differential delay of 16 millisecond. Maximum Doppler shift for Low Earth Orbit (LEO) satellites at 600 km altitude can be +/−48 KHz at 2 GHz carrier frequency. These extreme values of differential delay and Doppler shift are very challenging for UE synchronisation especially for initial access procedure.

One proposed way to deal with the synchronisation problem is to combine satellite position/reference Global Positioning System (GPS) time or another reference time knowledge through Global Navigation Satellite System (GNSS) capability. Satellite position may be derived according to satellite ephemeris broadcasted by the NTN network. Based on the information above, the UE can calculate the propagation delay and the Doppler shift and may be able to pre-compensate for them during the initial access procedure.

Although UE pre-compensation either via the GNSS capability or satellite ephemeris for synchronisation or through other means of synchronisation is possible, however, timing compensation could not be perfect in initial access which can lead to problems when receiving the PRACH. In particular, timing can be over compensated leading to reception outside of the PRACH window at the satellite and the base station. This could cause interferences and lead to poor detection performance at the network side and could interrupt the RACH procedure or cause failure on the RACH procedure.

On the other hand, the co-existence between UEs with auto-synchronisation capability (e.g., through GNSS capability or other means) and UEs with no auto-synchronisation capability is possible. UEs with no auto-synchronisation capability require more overhead in terms or time/frequency resources to avoid loss of orthogonality between UEs especially for the PRACH occasion configuration in initial access procedure. In contrast, UEs with auto-synchronisation capability are less demanding in terms of resources for the PRACH occasion configuration in initial access procedure. Therefore, different configuration designs are required for UEs with auto-synchronisation capability and UEs with no auto-synchronisation capability respectively.

Accordingly, for UEs with pre-compensation capability, how to avoid overcompensation to improve detection performance at the receiver becomes an important issue in the newly developed wireless communication network. Therefore, there is a need to provide proper PRACH timing advance design and PRACH configurations for better detection performance to meet performance requirements under severe NTN deployment scenarios.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to PRACH timing advance operation in NTN communications with respect to user equipment and network apparatus in mobile communications.

In one aspect, a method may involve an apparatus determining a propagation delay between the apparatus and a network node. The method may also involve the apparatus determining a pre-compensation timing margin. The method may further involve the apparatus performing a timing advance pre-compensation according to the propagation delay and the pre-compensation timing margin. The method may further involve the apparatus transmitting an uplink signal by applying the timing advance pre-compensation.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising determining a propagation delay between the apparatus and a network node. The processor may also determine a pre-compensation timing margin. The processor may further perform a timing advance pre-compensation according to the propagation delay and the pre-compensation timing margin. The processor may further transmit, via the transceiver, an uplink signal by applying the timing advance pre-compensation.

Another objective of the present disclosure is to propose solutions or schemes that address the aforementioned issues pertaining to PRACH configurations in NTN communications with respect to user equipment and network apparatus in mobile communications.

In one aspect, a method may involve an apparatus configuring a first set of PRACH configuration to a first set of UE. The method may also involve the apparatus configuring a second set of PRACH configuration to a second set of UE. The method may further involve the apparatus receiving a RACH preamble signal according to the first set of PRACH configuration and the second set of PRACH configuration. The first set of UE may comprise a timing advance pre-compensation capability. The second set of UE may comprise no timing advance pre-compensation capability.

In one aspect, an apparatus may comprise a transceiver which, during operation, wirelessly communicates with a plurality of UE of a wireless network. The apparatus may also comprise a processor communicatively coupled to the transceiver. The processor, during operation, may perform operations comprising configuring a first set of PRACH configuration to a first set of UE. The processor may also configure a second set of PRACH configuration to a second set of UE. The processor may further receive, via the transceiver, a RACH preamble signal according to the first set of PRACH configuration and the second set of PRACH configuration. The first set of UE may comprise a timing advance pre-compensation capability. The second set of UE may comprise no timing advance pre-compensation capability.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT), Industrial Internet of Things (IIoT) and non-terrestrial network (NTN), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to PRACH timing advance operation in NTN communications with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
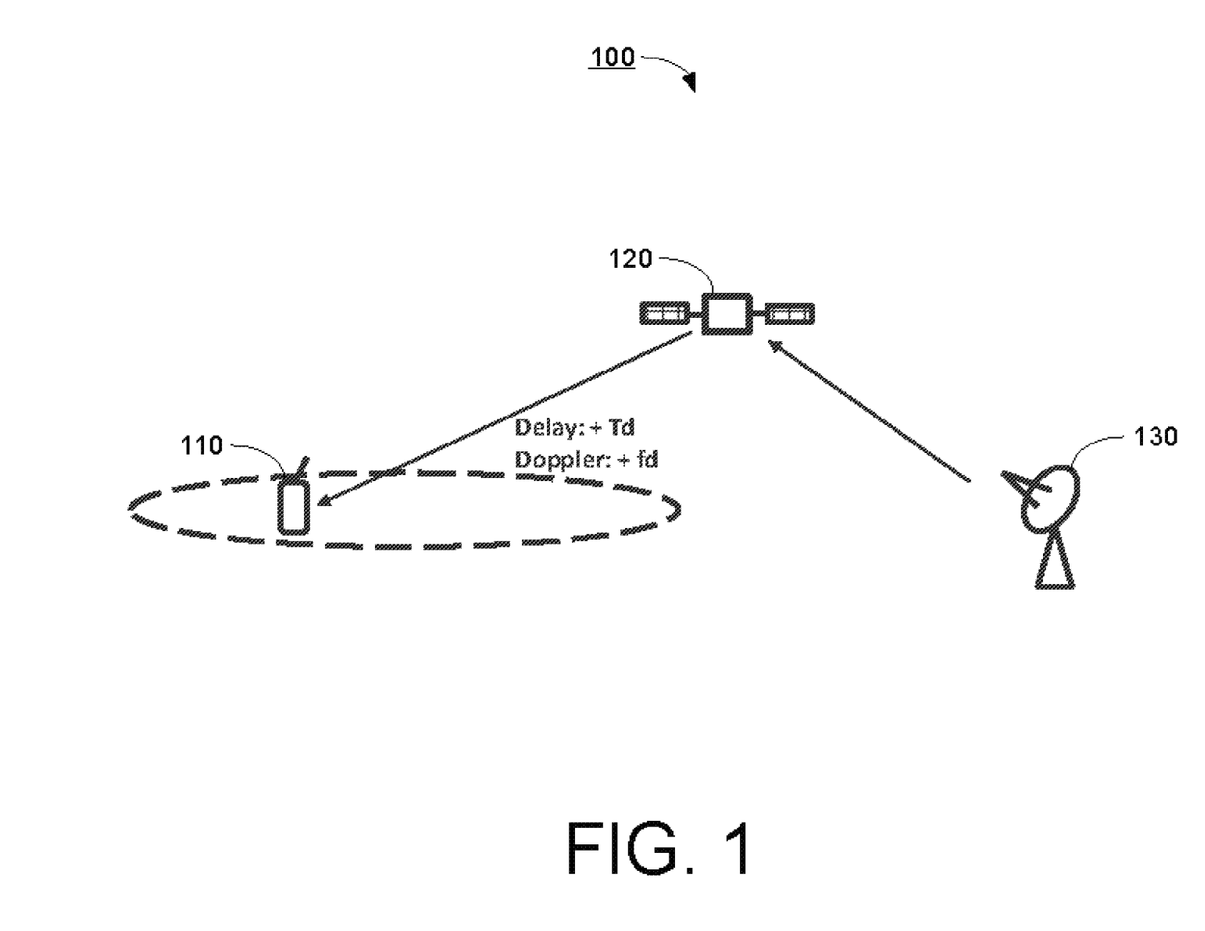
FIG. 1 is a diagram depicting an example NTN communication system under schemes in accordance with implementations of the present disclosure.

FIG. 1 illustrates an example NTN communication system 100 under schemes in accordance with implementations of the present disclosure. Scenario 100 involves UE 110, satellite 120 and base station 130, which may be a part of a wireless communication network (e.g., an LTE network, a 5G network, an NR network, an IoT network, an NB-IoT network, an IIoT network or an NTN network). UE 110 may be far from base station 130 (e.g., not within the communication range of base station 130) and not able to communicate with base station 130 directly. Via NTN, UE 110 may be able to transmit/receive signals to/from satellite 120. Satellite 120 may relay/transfer signals/data from UE 110 to base station 130. Thus, base station 130 may be able communicate with UE 110 via satellite 120.

In satellite NTN deployment, time and frequency synchronisation are very challenging. For example, for GEO satellites, Sat-to-UE delay could be around 135 millisecond at 10° elevation with a differential delay of 16 millisecond. Maximum Doppler shift for LEO satellites at 600 km altitude can be +/−48 KHz at 2 GHz carrier frequency. These extreme values of differential delay and Doppler shift are very challenging for UE synchronisation especially for initial access procedure.

One proposed way to deal with the synchronisation problem is to combine satellite position/reference GPS time or another reference time knowledge through GNSS capability. Satellite position may be derived according to satellite ephemeris broadcasted by the NTN network. Based on the information above, the UE can calculate the propagation delay and the Doppler shift and may be able to pre-compensate for them during the initial access procedure.

Although UE pre-compensation either via the GNSS capability or satellite ephemeris for synchronisation or through other means of synchronisation is possible, however, timing compensation could not be perfect in initial access which can lead to problems when receiving the PRACH at the satellite and base station. In particular, timing can be over compensated leading to transmissions outside of the PRACH window.

Figure 2:
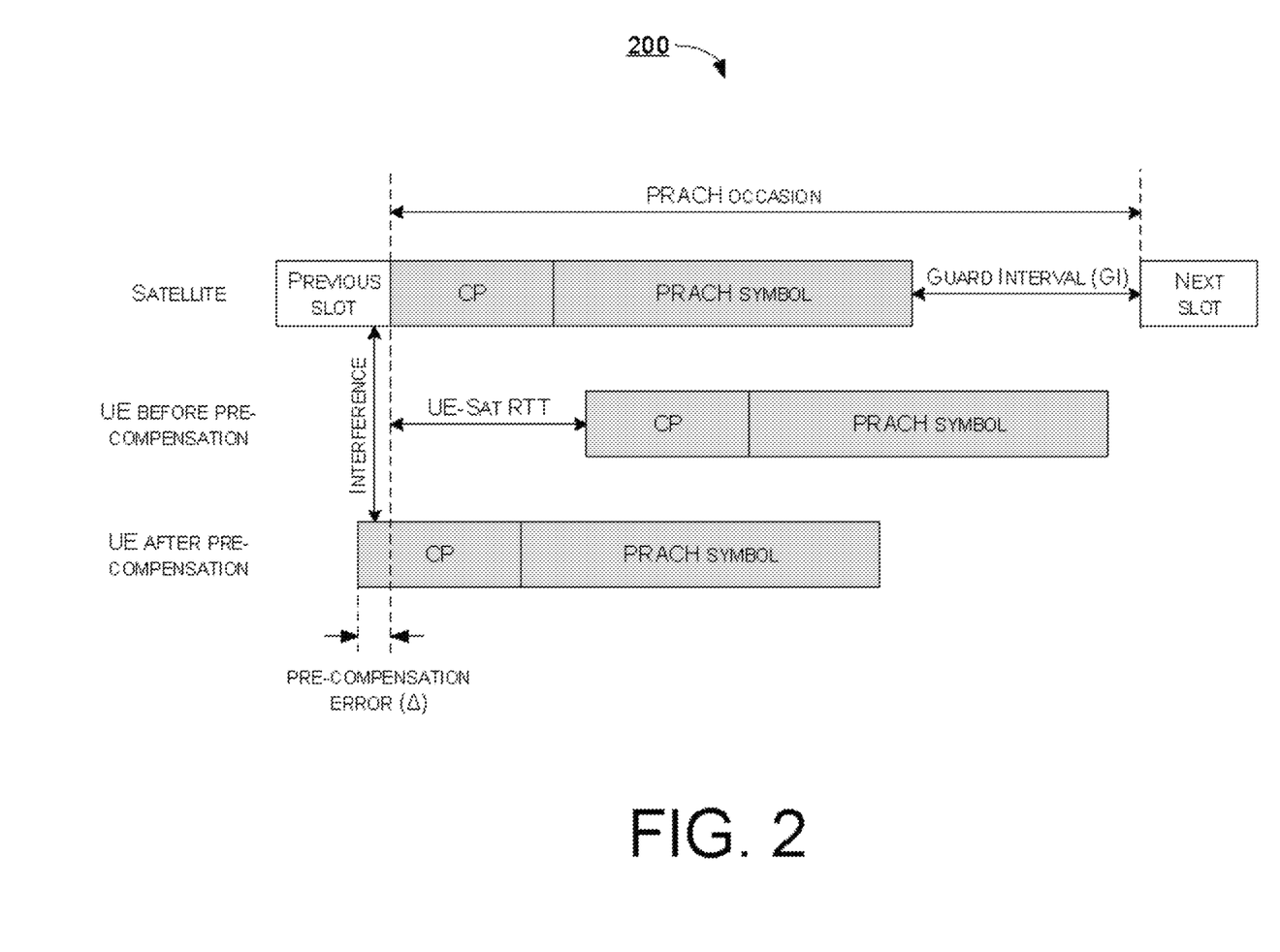
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE, a satellite and a base station, which may be a part of a wireless communication network (e.g., an LTE network, a 5G network, an NR network, an IoT network, an NB-IoT network, an IIoT network or an NTN network). A PRACH occasion is an area specified in time and frequency domain that are available for the reception of a PRACH preamble. The UE is configured to transmit the PRACH preamble signal within the PRACH occasion (e.g., a PRACH slot). The PRACH preamble signal structure may comprise a cyclic prefix (CP), a PRACH symbol (e.g., preamble sequence) and a guard interval (GI). The length of the CP and the preamble sequence are determined by the selected RACH preamble format. The guard interval may prevent the PRACH signal overlapping with other data transmissions.

As described above, the UE-to-Satellite round trip time (UE-Sat RTT) could be significant. Thus, the UE may be configured to perform pre-compensation by determining a timing advance (TA) to compensate the UE-Sat RTT for aligning the timing of frame boundary with the satellite. However, an overcompensation could occur due to some uncertainties or estimation errors. For example, the position of satellite may be not be perfect and comprise deviations. The estimated differential delay may not be correct. The position/delay information may not be accurate or up to date information. Therefore, it is possible that the UE can under or overestimate the timing advance for pre-compensation (e.g., pre-compensation error). As shown in FIG. 2, in an event that the UE over-compensate, the satellite and the base station will start receiving PRACH preamble signal before the PRACH opportunity and cause interference to previous slots. After CP removal, PRACH symbol truncation could result in loss of orthogonality.

In view of the above, the present disclosure proposes a number of schemes pertaining to PRACH timing advance operation in NTN communications with respect to the UE and the network apparatus. According to the schemes of the present disclosure, to avoid overcompensation of the TA, a timing offset (e.g., TA_offset) or a timing margin (e.g., TA_margin) may be introduced when enabling the timing advance pre-compensation. The UE with auto-synchronisation capability may apply the timing offset/timing margin to ensure that the PRACH preamble signal after pre-compensation will not be received outside the PRACH occasion. The length of the timing offset/timing margin may be properly designed to keep the received PRACH preamble signal within the PRACH occasion. Accordingly, when performing pre-compensation to compensate the long propagation delay between the UE and the satellite, the UE may be able to avoid overcompensation and transmit the PRACH preamble signal with the right timing so that it is received by the satellite and the base station within the PRACH occasion to avoid interference and detection failure at the receiver side.

Figure 3:
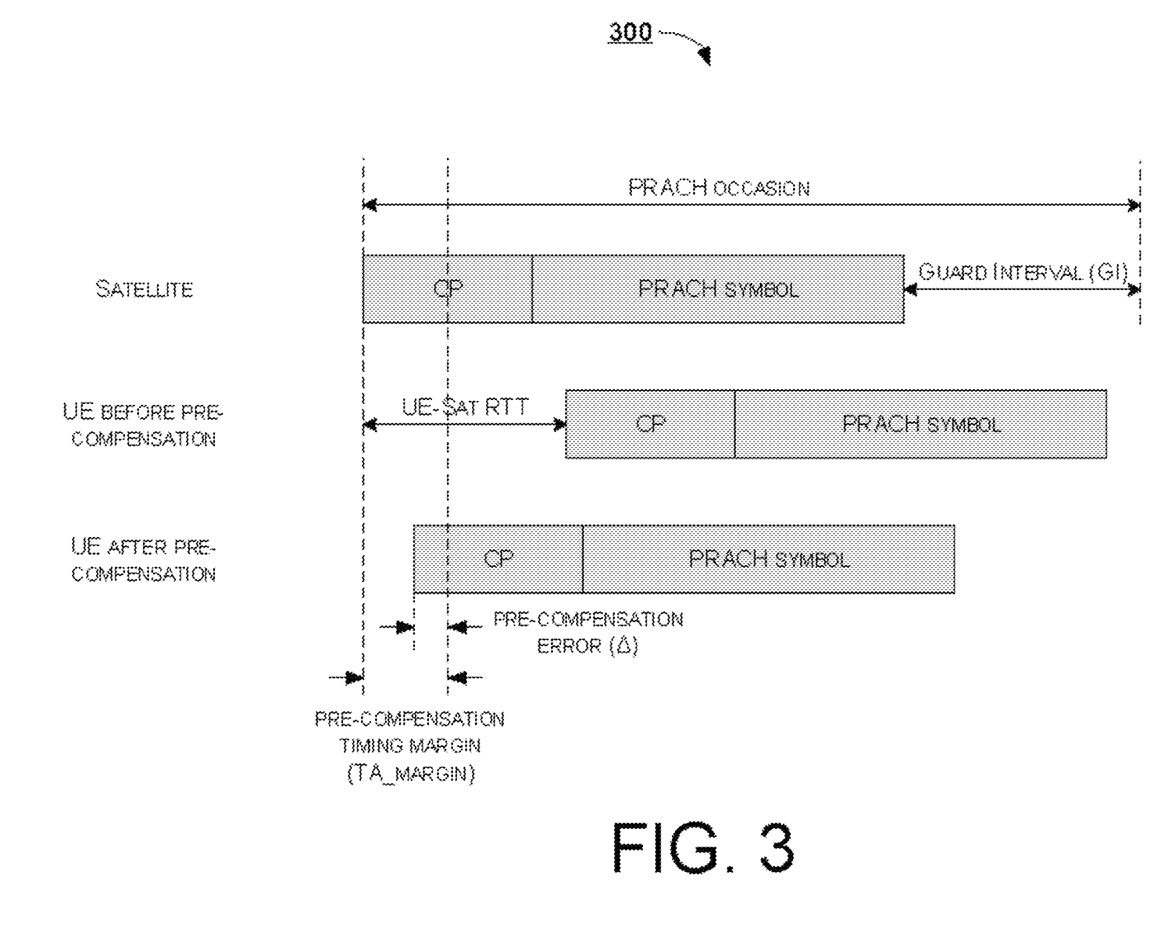
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE, a satellite and a base station, which may be a part of a wireless communication network (e.g., an LTE network, a 5G network, an NR network, an IoT network, an NB-IoT network, an IIoT network or an NTN network). To communicate with a network node, the UE may be configured to initial an initial access procedure (e.g., RACH procedure). The network node may comprise a satellite and/or a based station (e.g., gNB). The UE may have the auto-synchronisation capability through GNSS capability or other means. The UE may acquire satellite position or reference time information via the GNSS capability. The UE may determine/calculate a propagation delay (e.g., Td) between the apparatus and the network node (e.g., satellite) based on the acquired satellite position or reference time information. The UE may further determine the round trip time between the UE and the network node according to the propagation delay. For example, the round trip time is two times of the propagation delay (e.g., RTT=2*Td).

To avoid overcompensation of the delay due to uncertainty/estimation errors, the UE may be configured to apply a pre-compensation timing margin (e.g., TA_margin) when determining the timing advance. Specifically, the UE may be configured to determine the pre-compensation timing margin. The pre-compensation timing margin may be a predetermined value or signaled by the network node. For example, the pre-compensation timing margin may be a fixed value specified in 3rd Generation Partnership Project (3GPP) specifications. The value may be specified as CP/2 or CP/N, where N>1. In another example, the pre-compensation timing margin may be signaled by the network node (e.g., satellite or base station). In another example, the UE may determine the pre-compensation timing margin based on an estimated uncertainty plus a fixed value.

When performing the pre-compensation, the UE may be configured to determine a timing advance according to the propagation delay and the pre-compensation timing margin. For example, the timing advance may be determined as the round trip time minus the pre-compensation timing margin (e.g., 2*Td−TA_margin). The UE may be configured to transmit an uplink signal (e.g., PRACH preamble signal) by a timing advance of the round trip time minus the pre-compensation timing margin. Thus, when applying the pre-compensation for a delay Td, instead of transmitting at time t based on the downlink sub-frame/symbol boundary, the UE should transmit at time t−(2*Td−TA_margin). As shown in FIG. 3, when compensating the UE-Sat RTT, the overcompensation could occur due to the pre-compensation error (e.g., Δ). After applying the pre-compensation timing margin, the overcompensation can be avoided by delaying the start of the PRACH preamble signal for the pre-compensation timing margin (e.g., TA_margin). The pre-compensation timing margin should be greater than the pre-compensation error. Accordingly, the UE may guarantee that the PRACH preamble signal can be received by the satellite and the base station within the PRACH window when performing the pre-compensation for propagation delay. The PRACH preamble signal can be correctly received and detected at the receiver side (e.g., satellite) without unnecessary interferences.

The timing advance maintenance with delay pre-compensation enabled can be further performed. Specifically, in an initial access procedure (e.g., PRACH transmission or message A transmission in 2-Step RACH), the pre-compensation timing margin (e.g., TA_margin) described above may be applied. The UE may be configured to receive a timing advance command from the network node (e.g., satellite and/or base station). The UE may update the timing advance according to the timing advance command received from the network node. For example, the UE may receive the initial timing advance command (e.g., TA_cmd) in a RACH response message from the satellite/base station. The UE may update the timing advance from an old value (e.g., TA_old) to a new value (e.g., TA_new). TA_old= $(2*Td\_old-TA\_margin)$. TA_new=$(2*Td\_new-TA\_margin+TA\_cmd)$. Td_old may be a previous propagation delay estimated by the UE. Td_new may be an updated propagation delay determined by the UE during the initial access procedure.

After the timing advance has been acquired in the initial access by the above procedure, the timing advance adjustment/update may be further performed. Specifically, the UE may be configured to autonomously calculate the new propagation delay (e.g., Td_new) from the network node (e.g., satellite and/or base station). The UE may update the timing advance according to the updated propagation delay received from the network node. For example, the UE may determine/estimate a timing advance update according to a component of $2*(Td\_new-Td\_old)$. The UE may determine/estimate the timing advance update by TA_new=TA_old+$2*(Td\_new-Td\_old)$+TA_cmd. TA_cmd may be the updated TA_cmd received from the network node (e.g., satellite and/or base station).

On the other hand, the co-existence between UEs with auto-synchronisation capability (e.g., through GNSS capability or other means) and UEs with no auto-synchronisation capability is possible. UEs with no auto-synchronisation capability require more overhead in terms or time/frequency resources to avoid loss of orthogonality between UEs especially for the PRACH occasion configuration in initial access procedure. UEs with no auto-synchronisation capability may require new RACH design in LEO due to not being able to differentiate crystal error for internal clock and carrier frequency generation and Doppler due to satellite motion. In contrast, UEs with auto-synchronisation capability are less demanding in terms of resources for the PRACH occasion configuration in initial access procedure. Therefore, different configuration designs are required for UEs with auto-synchronisation capability and UEs with no auto-synchronisation capability respectively.

PRACH configurations required for support of UEs with no pre-compensation capability of delay (e.g., through GNSS capability, auto-synchronisation or other means) leads larger overhead to support extreme delay. The network (e.g., satellite and/or base station) may configure 2 different sets of PRACH configurations for UEs with different capabilities. For example, PRACH configuration 1 may be used by UEs with pre-compensation capability. PRACH configuration 2 may be used by UEs with no pre-compensation capability. The network may signal the information about the mapping between pre-compensation capability and which PRACH configuration to use. Potentially, the 2 PRACH configurations may have different periodicities and may be multiplexed in frequency and/or time or both.

Figure 4:
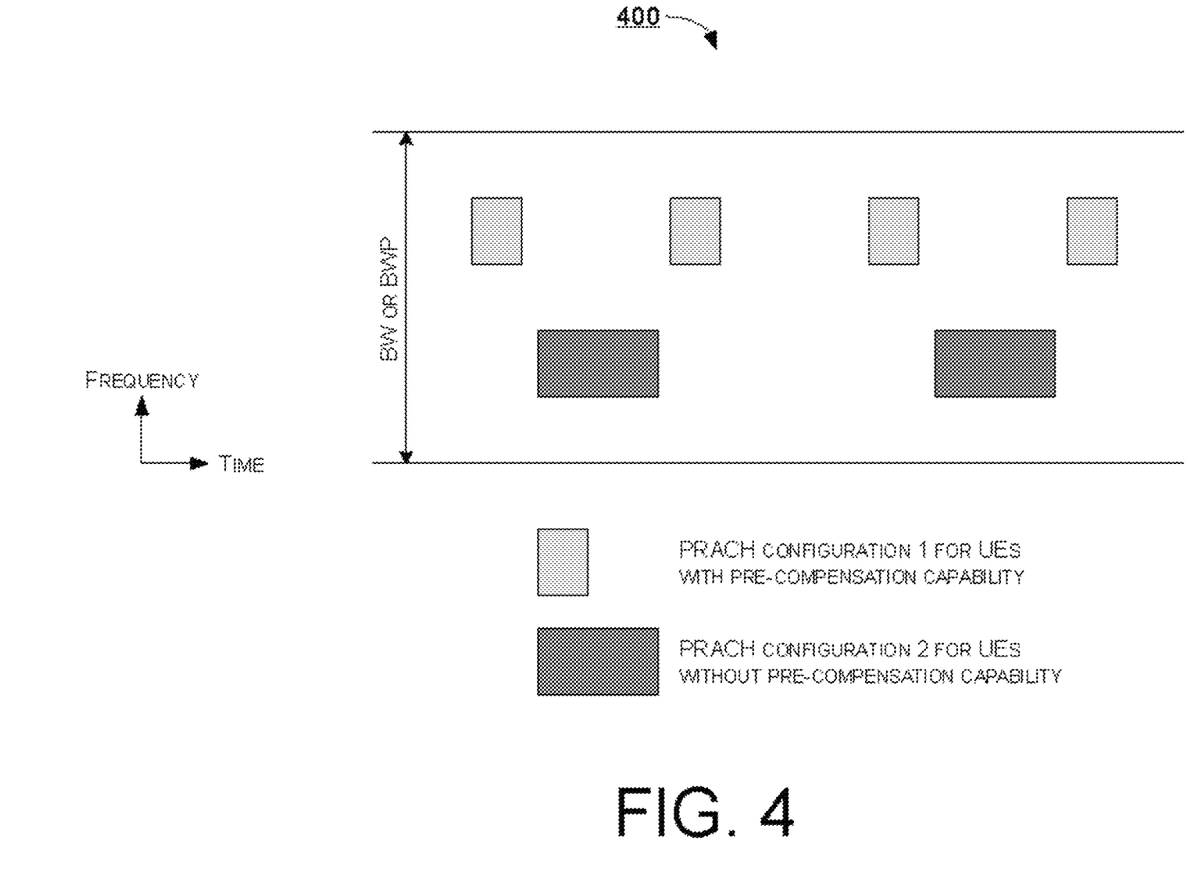
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a plurality of UEs and a network node/apparatus (e.g., a satellite and/or a base station), which may be a part of a wireless communication network (e.g., an LTE network, a 5G network, an NR network, an IoT network, an NB-IoT network, an IIoT network or an NTN network). The network node may be configured to configure a first set of PRACH configuration to a first set of UE. The first set of UE may comprise a timing advance pre-compensation capability. The network node may be configured to configure a second set of PRACH configuration to a second set of UE. The second set of UE may comprise no timing advance pre-compensation capability. Then, the network node may be configured to receive a RACH preamble signal according to the first set of PRACH configuration and the second set of PRACH configuration. The first set of PRACH configuration and the second set of PRACH configuration may comprise different sets of RACH preamble occasions. For example, the periodicity of the second set of PRACH configuration is greater than the periodicity of the first set of PRACH configuration. The first set of PRACH configuration and the second set of PRACH configuration may comprise different sizes of overheads or radio resources. For example, the time/frequency resources of the second set of PRACH configuration is larger than the time/frequency resources of the first set of PRACH configuration.

Illustrative Implementations

Figure 5:
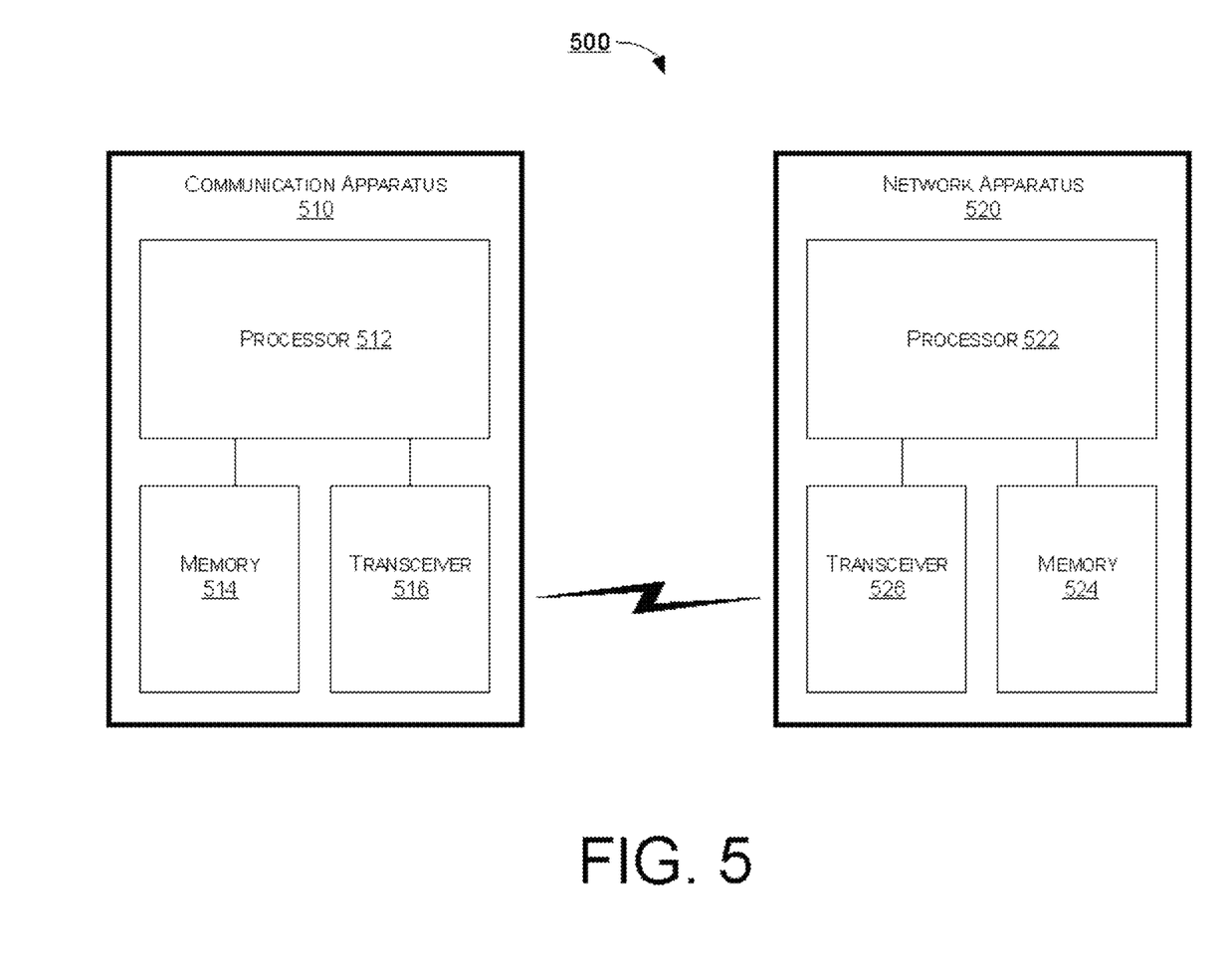
FIG. 5 is a block diagram of an example communication apparatus and an example network apparatus in accordance with an implementation of the present disclosure.

FIG. 5 illustrates an example communication apparatus 510 and an example network apparatus 520 in accordance with an implementation of the present disclosure. Each of communication apparatus 510 and network apparatus 520 may perform various functions to implement schemes, techniques, processes and methods described herein pertaining to PRACH timing advance operation in NTN communications with respect to user equipment and network apparatus in wireless communications, including scenarios/schemes described above as well as processes 600 and 700 described below.

Communication apparatus 510 may be a part of an electronic apparatus, which may be a UE such as a portable or mobile apparatus, a wearable apparatus, a wireless communication apparatus or a computing apparatus. For instance, communication apparatus 510 may be implemented in a smartphone, a smartwatch, a personal digital assistant, a digital camera, or a computing equipment such as a tablet computer, a laptop computer or a notebook computer. Communication apparatus 510 may also be a part of a machine type apparatus, which may be an IoT, NB-IoT, IIoT or NTN apparatus such as an immobile or a stationary apparatus, a home apparatus, a wire communication apparatus or a computing apparatus. For instance, communication apparatus 510 may be implemented in a smart thermostat, a smart fridge, a smart door lock, a wireless speaker or a home control center. Alternatively, communication apparatus 510 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 510 may include at least some of those components shown in FIG. 5 such as a processor 512, for example. Communication apparatus 510 may further include one or more other components not pertinent to the proposed scheme of the present disclosure (e.g., internal power supply, display device and/or user interface device), and, thus, such component(s) of communication apparatus 510 are neither shown in FIG. 5 nor described below in the interest of simplicity and brevity.

Network apparatus 520 may be a part of an electronic apparatus/station, which may be a network node such as a base station, a small cell, a router, a gateway or a satellite. For instance, network apparatus 520 may be implemented in an eNodeB in an LTE, in a gNB in a 5G, NR, IoT, NB-IoT, IIoT, or in a satellite in an NTN network. Alternatively, network apparatus 520 may be implemented in the form of one or more IC chips such as, for example and without limitation, one or more single-core processors, one or more multi-core processors, or one or more RISC or CISC processors. Network apparatus 520 may include at least some of those components shown in FIG. 5 such as a processor 522, for example. Network apparatus 520 may further include one or more other components not pertinent to the proposed scheme of the present disclosure (e.g., internal power supply, display device and/or user interface device), and, thus, such component(s) of network apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including power consumption reduction in a device (e.g., as represented by communication apparatus 510) and a network (e.g., as represented by network apparatus 520) in accordance with various implementations of the present disclosure.

In some implementations, communication apparatus 510 may also include a transceiver 516 coupled to processor 512 and capable of wirelessly transmitting and receiving data. In some implementations, communication apparatus 510 may further include a memory 514 coupled to processor 512 and capable of being accessed by processor 512 and storing data therein. In some implementations, network apparatus 520 may also include a transceiver 526 coupled to processor 522 and capable of wirelessly transmitting and receiving data. In some implementations, network apparatus 520 may further include a memory 524 coupled to processor 522 and capable of being accessed by processor 522 and storing data therein. Accordingly, communication apparatus 510 and network apparatus 520 may wirelessly communicate with each other via transceiver 516 and transceiver 526, respectively. To aid better understanding, the following description of the operations, functionalities and capabilities of each of communication apparatus 510 and network apparatus 520 is provided in the context of a mobile communication environment in which communication apparatus 510 is implemented in or as a communication apparatus or a UE and network apparatus 520 is implemented in or as a network node of a communication network.

In some implementations, to communicate with network apparatus 520, processor 512 may be configured to initial an initial access procedure (e.g., RACH procedure). Processor 512 may have the auto-synchronisation capability through GNSS capability or other means. Processor 512 may acquire satellite position or reference time information via the GNSS capability. Processor 512 may determine/calculate a propagation delay (e.g., Td) between communication apparatus 510 and network apparatus 520 based on the acquired satellite position or reference time information. Processor 512 may further determine the round trip time between communication apparatus 510 and network apparatus 520 according to the propagation delay. For example, processor 512 may determine that the round trip time is two times of the propagation delay (e.g., RTT=2*Td).

In some implementations, to avoid overcompensation of the delay due to uncertainty/estimation errors, processor 512 may be configured to apply a pre-compensation timing margin (e.g., TA_margin) when determining the timing advance. Specifically, processor 512 may be configured to determine the pre-compensation timing margin. The pre-compensation timing margin may be a pre-determined value or signaled by network apparatus 520. For example, the pre-compensation timing margin may be a fixed value stored in memory 514. In another example, the pre-compensation timing margin may be signaled by network apparatus 520. In another example, processor 512 may determine the pre-compensation timing margin based on an estimated uncertainty plus a fixed value.

In some implementations, when performing the pre-compensation, processor 512 may be configured to determine a timing advance according to the propagation delay and the pre-compensation timing margin. For example, processor 512 may determine the timing advance as the round trip time minus the pre-compensation timing margin (e.g., 2*Td–TA_margin). Processor 512 may be configured to transmit, via transceiver 516, an uplink signal (e.g., PRACH preamble signal) by a timing advance of the round trip time minus the pre-compensation timing margin. Thus, when applying the pre-compensation for a delay Td, instead of transmitting at time t based on the downlink sub-frame/symbol boundary, processor 512 should transmit at time t−(2*Td−TA_margin). Accordingly, processor 512 may guarantee that the PRACH preamble signal can be transmitted within the PRACH window when performing the pre-compensation for propagation delay. The PRACH preamble signal can be correctly received and detected at network apparatus 520 without unnecessary interferences.

In some implementations, in an initial access procedure (e.g., PRACH transmission or message A transmission in 2-Step RACH), processor 512 may apply the pre-compensation timing margin (e.g., TA_margin) described above. Processor 512 may be configured to receive, via transceiver 516, a timing advance command from network apparatus 520. Processor 512 may update the timing advance according to the timing advance command received from the network node. For example, processor 512 may receive the initial timing advance command (e.g., TA_cmd) in a RACH response message from network apparatus 520. Processor 512 may update the timing advance from an old value (e.g., TA_old) to a new value (e.g., TA_new). TA_old= (2*Td_old−TA_margin). TA_new=(2*Td_new−TA_margin+TA_cmd). Td_old may be a previous propagation delay estimated by processor 512. Td_new may be an updated propagation delay determined by processor 512 during the initial access procedure.

In some implementations, processor 512 may be configured to calculate an updated propagation delay (e.g., Td_new). Processor 512 may update the timing advance according to the updated propagation delay received from network apparatus 520. For example, processor 512 may determine/estimate a timing advance update according to a component of 2*(Td_new−Td_old). Processor 512 may determine/estimate the timing advance update by TA_new=TA_old+2*(Td_new−Td_old)+TA_cmd. TA_cmd may be the updated TA_cmd received from network apparatus 520.

In some implementations, network apparatus 520 may be configured to configure a first set of PRACH configuration to a first set of communication apparatus. The first set of communication apparatus may comprise a timing advance pre-compensation capability. Network apparatus 520 may be configured to configure a second set of PRACH configuration to a second set of communication apparatus. The second set of communication apparatus may comprise no timing advance pre-compensation capability. Then, network apparatus 520 may be configured to receive, via transceiver 526, a RACH preamble signal according to the first set of PRACH configuration and the second set of PRACH configuration. The first set of PRACH configuration and the second set of PRACH configuration may comprise different sets of RACH preamble occasions. The first set of PRACH configuration and the second set of PRACH configuration may comprise different sizes of overheads or radio resources.

Illustrative Processes

Figure 6:
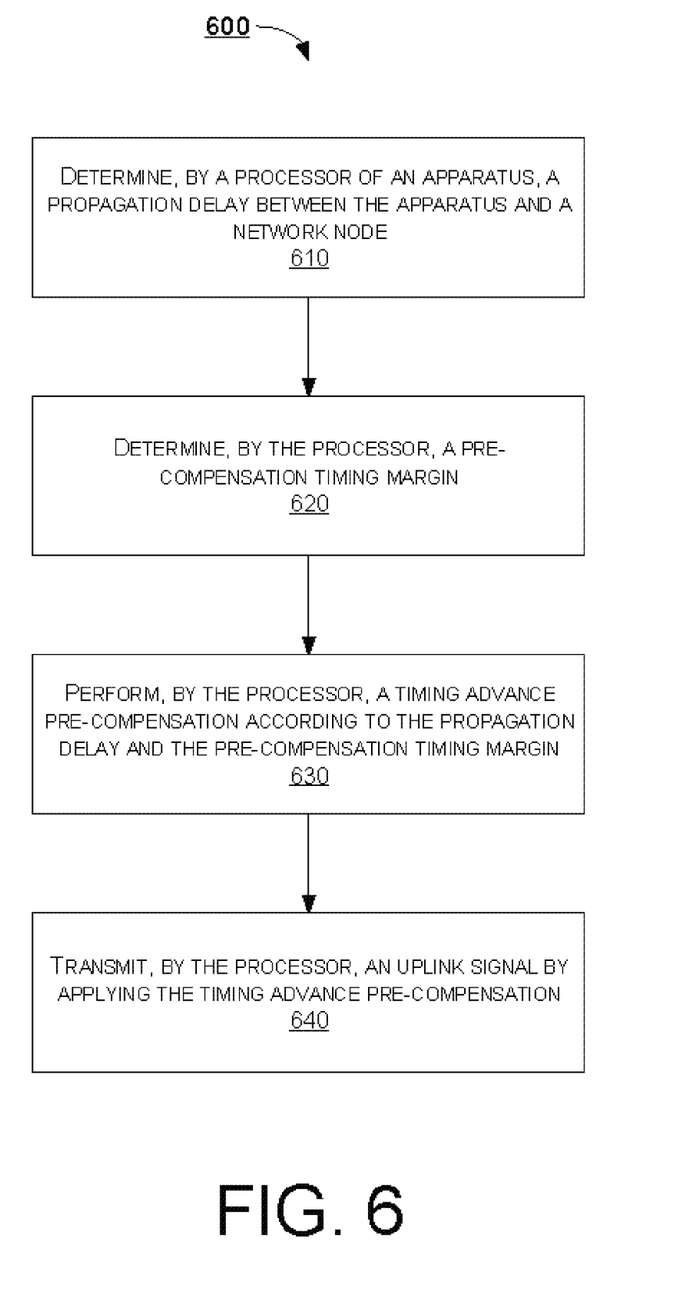
FIG. 6 is a flowchart of an example process in accordance with an implementation of the present disclosure.

FIG. 6 illustrates an example process 600 in accordance with an implementation of the present disclosure. Process 600 may be an example implementation of schemes described above, whether partially or completely, with respect to PRACH timing advance operation in NTN communications with the present disclosure. Process 600 may represent an aspect of implementation of features of communication apparatus 510. Process 600 may include one or more operations, actions, or functions as illustrated by one or more of blocks 610, 620, 630 and 640. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may be implemented by communication apparatus 510 or any suitable UE or machine type devices. Solely for illustrative purposes and without limitation, process 600 is described below in the context of communication apparatus 510. Process 600 may begin at block 610.

At 610, process 600 may involve processor 512 of apparatus 510 determining a propagation delay between the apparatus and a network node. Process 600 may proceed from 610 to 620.

At 620, process 600 may involve processor 512 determining a pre-compensation timing margin. Process 600 may proceed from 620 to 630.

At 630, process 600 may involve processor 512 performing a timing advance pre-compensation according to the propagation delay and the pre-compensation timing margin. Process 600 may proceed from 630 to 640.

At 640, process 600 may involve processor 512 transmitting an uplink signal by applying the timing advance pre-compensation.

In some implementations, the pre-compensation timing margin is applied to avoid an overcompensation on the uplink signal.

In some implementations, process 600 may involve processor 512 determining a round trip time between the apparatus and the network node according to the propagation delay.

In some implementations, process 600 may involve processor 512 transmitting the uplink signal by a timing advance of the round trip time minus the pre-compensation timing margin.

In some implementations, the pre-compensation timing margin may be a pre-determined value or signaled by the network node.

In some implementations, process 600 may involve processor 512 receiving a timing advance command from the network node. Process 600 may further involve processor 512 updating the timing advance according to the timing advance command received from the network node.

In some implementations, process 600 may involve processor 512 calculating an updated propagation delay. Process 600 may further involve processor 512 updating the timing advance according to the updated propagation delay received from the network node.

Figure 7:
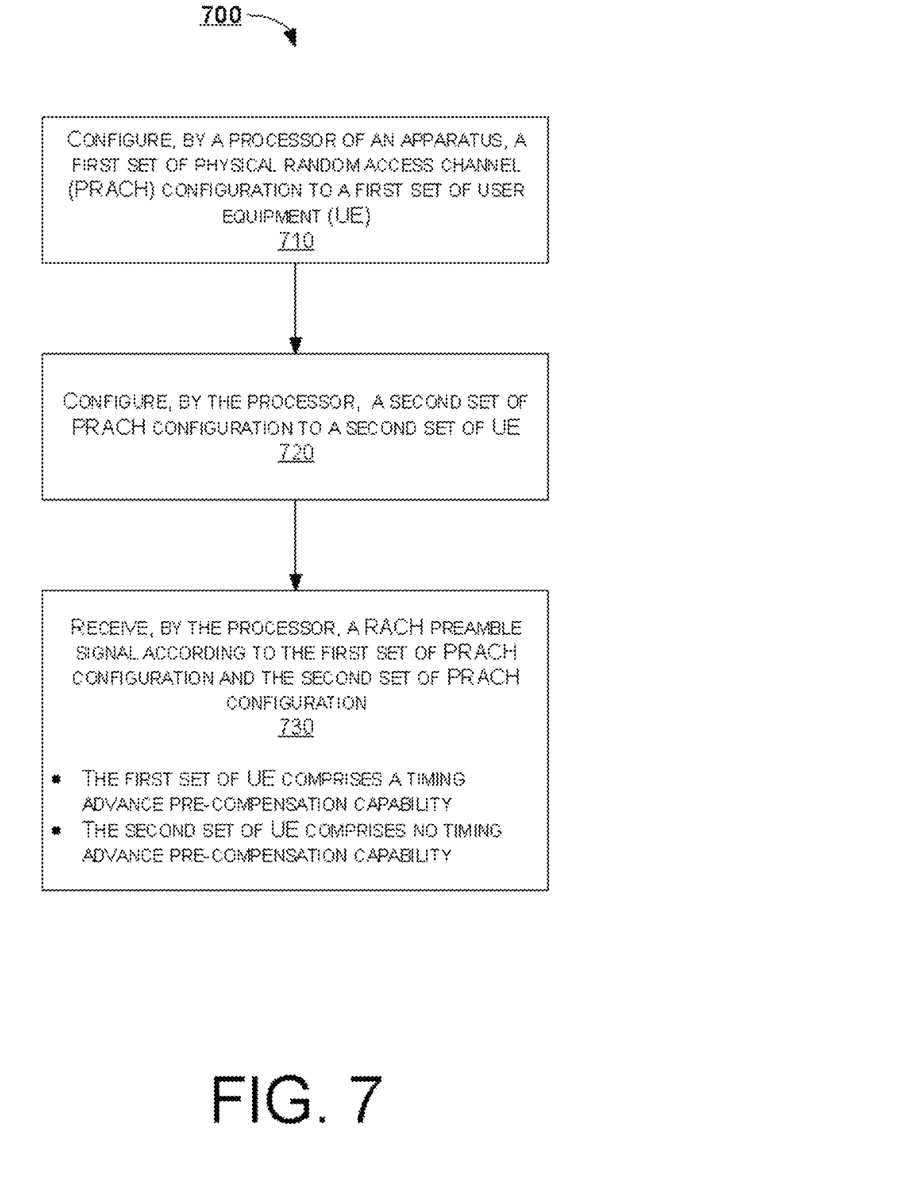
FIG. 7 is a flowchart of an example process in accordance with an implementation of the present disclosure.

FIG. 7 illustrates an example process 700 in accordance with an implementation of the present disclosure. Process 700 may be an example implementation of schemes described above, whether partially or completely, with respect to PRACH configurations in NTN communications with the present disclosure. Process 700 may represent an aspect of implementation of features of network apparatus 520. Process 700 may include one or more operations, actions, or functions as illustrated by one or more of blocks 710, 720 and 730. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively, in a different order. Process 700 may be implemented by network apparatus 520 or any suitable network nodes or satellites. Solely for illustrative purposes and without limitation, process 700 is described below in the context of network apparatus 520. Process 700 may begin at block 710.

At 710, process 700 may involve processor 522 of apparatus 520 configuring a first set of PRACH configuration to a first set of UE. Process 700 may proceed from 710 to 720.

At 720, process 700 may involve processor 522 configuring a second set of PRACH configuration to a second set of UE. Process 700 may proceed from 720 to 730.

At 730, process 700 may involve processor 522 receiving a RACH preamble signal according to the first set of PRACH configuration and the second set of PRACH configuration. The first set of UE may comprise a timing advance pre-compensation capability. The second set of UE may comprise no timing advance pre-compensation capability.

In some implementations, the first set of PRACH configuration and the second set of PRACH configuration may comprise different sets of RACH preamble occasions.

In some implementations, the first set of PRACH configuration and the second set of PRACH configuration may comprise different sizes of overheads or radio resources.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

The invention claimed is:

1. A method, comprising:
   determining, by a processor of an apparatus, a propagation delay between the apparatus and a network node;
   determining, by the processor, a pre-compensation timing margin;
   performing, by the processor, a timing advance pre-compensation according to the propagation delay and the pre-compensation timing margin; and
   transmitting, by the processor, an uplink signal by applying the timing advance pre-compensation.

2. The method of claim 1, wherein the pre-compensation timing margin is applied to avoid an overcompensation on the uplink signal.

3. The method of claim 1, wherein the pre-compensation timing margin is a pre-determined value or signaled by the network node.

4. The method of claim 1, further comprising:
   determining, by the processor, a round trip time between the apparatus and the network node according to the propagation delay.

5. The method of claim 4, wherein the transmitting comprises transmitting the uplink signal by a timing advance of the round trip time minus the pre-compensation timing margin.

6. The method of claim 4, further comprising:
   receiving, by the processor, a timing advance command from the network node; and
   updating, by the processor, the timing advance according to the timing advance command received from the network node.

7. The method of claim 4, further comprising:
   calculating, by the processor, an updated propagation delay; and
   updating, by the processor, the timing advance according to the updated propagation delay received from the network node.

8. An apparatus, comprising:
   a transceiver which, during operation, wirelessly communicates with a network node of a wireless network; and
   a processor communicatively coupled to the transceiver such that, during operation, the processor performs operations comprising:
      determining a propagation delay between the apparatus and a network node;
      determining a pre-compensation timing margin;

performing a timing advance pre-compensation according to the propagation delay and the pre-compensation timing margin; and transmitting, via the transceiver, an uplink signal by applying the timing advance pre-compensation.

9. The apparatus of claim 8, wherein the pre-compensation timing margin is applied to avoid an overcompensation on the uplink signal.

10. The apparatus of claim 8, wherein the pre-compensation timing margin is a pre-determined value or signaled by the network node.

11. The apparatus of claim 8, wherein, during operation, the processor further performs operations comprising:

determining a round trip time between the apparatus and the network node according to the propagation delay.

12. The apparatus of claim 11, wherein, in transmitting the uplink signal, the processor transmits the uplink signal by a timing advance of the round trip time minus the pre-compensation timing margin.

13. The apparatus of claim 11, wherein, during operation, the processor further performs operations comprising:

receiving, via the transceiver, a timing advance command from the network node; and updating the timing advance according to the timing advance command received from the network node.

14. The apparatus of claim 11, wherein, during operation, the processor further performs operations comprising:

calculating an updated propagation delay; and updating the timing advance according to the updated propagation delay received from the network node.

\* \* \* \* \*